June 29, 1943. P. DANIELSSON 2,322,831
METHOD OF AND MACHINE FOR EVISCERATING FISH
Filed Feb. 27, 1942 2 Sheets-Sheet 1
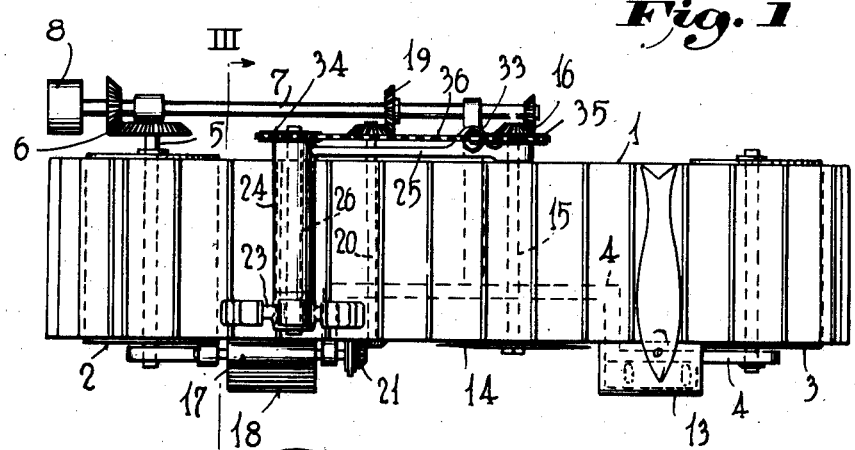
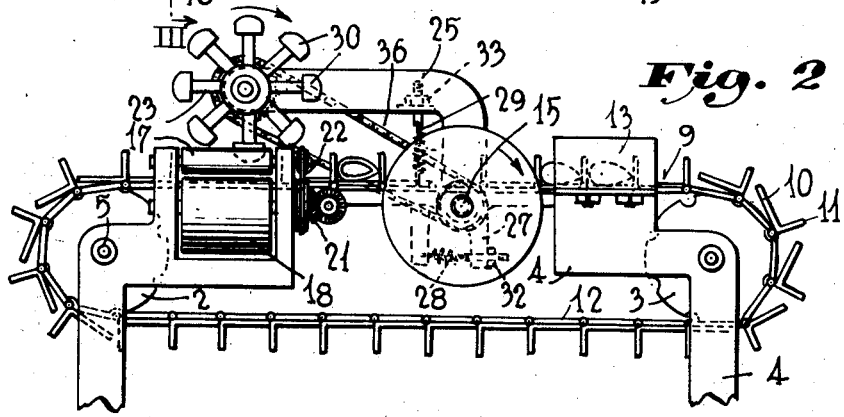
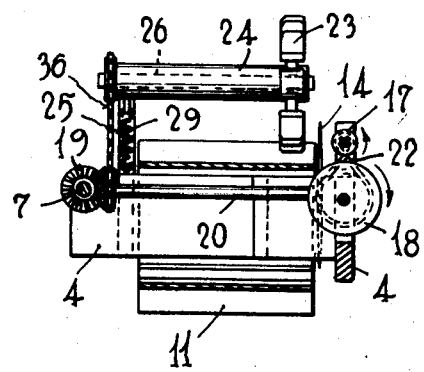
Inventor,
Paul Danielsson
By Sommers-Young,
Attorneys

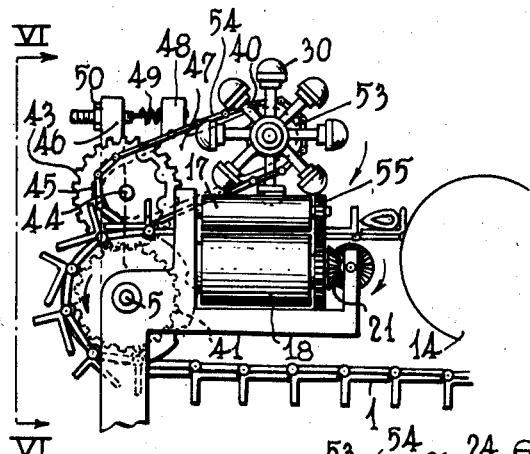
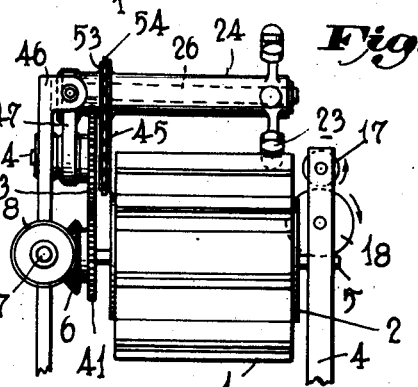
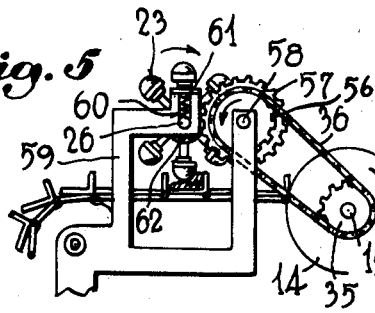
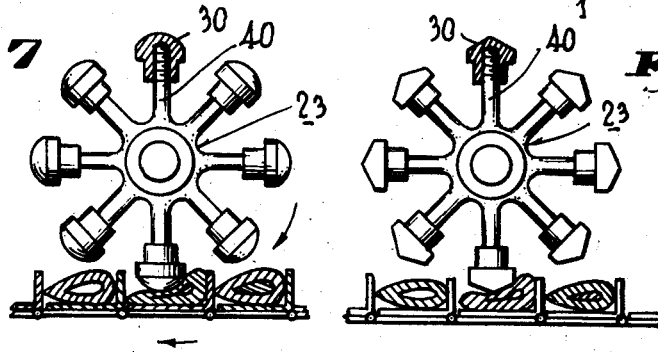

Patented June 29, 1943

2,322,831

UNITED STATES PATENT OFFICE 2,322,831

METHOD OF AND MACHINE FOR EVISCERATING FISH

Paul Danielsson, Stockholm, Sweden, assignor to Aktiebolaget Gerh. Arehns Mekaniska, Verkstad, Stockholm, Sweden, a Swedish joint-stock company Application February 27, 1942, Serial No. 432,715
In Sweden March 1, 1941

13 Claims. (Cl. 17—3)

This invention relates to the eviscerating of fishes, and more particularly to the removal of the entrails through the head end of the fish opened by decapitating the fish or cutting the belly at the head end of the fish. In a preferred method and means for that purpose the fish is fed past means that pull the entrails out of the body of the fish by part of the entrails projecting out of the cut head end of the fish.

It is an object of my invention to gently but neverthless effectively treat the body of the fish to present the entrails to said pulling means, so that said entrails will be effectively removed from the body of the fish.

With this and other objects in view, as will appear hereinafter, my invention consists of certain novel features of construction, combination and arrangements of parts, as will be hereinafter described and particularly set forth in the claims hereunto appended.

In the accompanying drawings are shown by way of example some constructions of the invention.

Fig. 1 is a plan view of a fish eviscerating machine provided with means embodying the invention;

Fig. 2 is a side elevational view of part of the machine;

Fig. 3 is a cross sectional view on the line III—III of Fig. 1;

Figs. 4 and 5 are side elevational views of the left part of the machine as shown in Fig. 2 but illustrating two modified embodiments of the invention;

Fig. 6 is an end view in the direction VI—VI of Fig. 4;

Figs. 7 and 8 show on an enlarged scale two different embodiments of part of the machine.

Like characters of reference refer to similar or corresponding parts and portions throughout the several views of the drawings.

The machine as shown in Figs. 1 to 3 comprises a conveyor 1 which consists of an endless sprocket chain 12 which runs over a driving sprocket 2 and an idle sprocket 3, both said sprockets being rotatably journalled in the machine frame 4. The sprocket 2 is secured to a rotary shaft 5 which by means of a bevel gearing 6 is connected to a rotary shaft 7 which is driven continuously by a belt pulley 8 and belt (not shown). The fish conveyor 1 has transversal pockets 9 formed by angle-irons which consist each of an impeller 11 and a bottom plate 10. The bottom plates may, if desired, be omitted, in which case the fish are by the impellers advanced upon a conveyor track formed by a bottom plate, for instance. At one side of the conveyor 1 a gage plate 13 is arranged adjustably transversely to the conveyor. At the same side of the conveyor there is provided a rotary cutter 14 for decapitating in transit fish that are advanced by the conveyor. The cutter 14 is secured to a rotary shaft 15, which is driven continuously by the shaft 7 and a bevel gearing 16. In succession to the cutter 14 and at the same side of the conveyor as the latter two cooperating eviscerating rollers 17 and 18 are arranged to pull the entrails out of the decapitated fish. The lower roller 18 is rotated by the shaft 7 by means of a bevel gearing 19, a shaft 20 and another bevel gearing 21. The upper roller 17 is rotated by the roller 18 by means of a crossed rope 22, so that the two rollers revolve in opposite directions but at the same circumferential velocities. Behind and adjacent to the roller 17, above the conveyor 1, there is a press wheel 23 which is secured to a shaft 26 which is rotatably journalled in a hub 24 of a lever arm 25. The lever arm 25 is turnably journalled on the shaft 15 and provided with a downwardly directed rear extension 27 which by means of a tension spring 28 is connected to the machine frame. Another tension spring 29 connects the lever arm 25 with the machine frame. A sprocket 34 is secured to the shaft 26 and rotated by a sprocket chain 36 which also runs over another sprocket wheel 35 secured to the shaft 15 so that the rotary movement of the shaft 7 is transmitted to the press wheel 23. The press wheel 23 is provided with a series of press heads 30 the pressing surfaces of which may consist of cylindrical segments directed transversely to the fish feeding direction, i. e. longitudinally of the fish. Instead thereof the pressing surfaces may, however, have the shape of calottes (Fig. 7) or be ridgy (Fig. 8) and extend longitudinally of the fish. By forming the pressing surfaces in this manner the press heads will effectively jam the soft portion (belly) of the fish, even though the press power is relatively slight. The press power of the press head 30 upon the body of the fish can be increased or decreased by adjustment of nuts 32 and 33 to vary the tensions of the springs 28 and 29.

In the operation of the machine as shown in Figs. 1 to 3, the fish are successively placed belly rearward into the conveyor pockets 9, so that their head ends abut the gage plate 13. On their advance after having been decapitated by the cutter 14 the fish are introduced transversely below the press wheel 23 simultaneously as the said wheel moves a press head 30 forwardly and down into a pocket 9 to engage the belly of the fish only near the cut head end of the fish simultaneously as it moves together with the fish in the feeding direction. Thereby the entrails at the head end of the fish are squeezed out of said end and simultaneously or afterwards introduced into the bite between the eviscerating rollers 17 and 18. Then the rollers 17 and 18 pull the entrails (air bladder, stomach and other waste) by their outwardly projecting part out of the body of the fish, and this pulling action continues after the press head 30, moving in a circular path, has been elevated from the fish and its pressure upon same has been released. Even though the press power upon the fish is relatively slight the entrails will be squeezed out by said pressure sufficiently to be effectively grasped by the eviscerating rollers as the pressure does not act upon the hard back of the fish but upon its soft belly only. At the beginning of the eviscerating the press head will prevent valuable parts, such as roe and milt, from being pulled out together with the intestine, and during the last phase of the eviscerating they will remain within the body of the fish, even though the pressure upon the fish has been released, for then said valuable parts have already been effectively separated from the other parts of the entrails. It is desirable to adjust the press heads 30 in dependence of the sizes of the fish, so that the press power does not vary unduly in dependence of varying thicknesses of the fish. In the embodiment as shown in Figs. 1 to 3, this is effected by elevating the press wheel 23 by applying the press head upon a fish. Thus the arm 25 is swung upward so that also a slight component of movement against the fish feeding direction is imparted to the press head. The forward movement of the press head 30 is thereby retarded slightly, so that it is displaced from the front wall of the pocket 9 and presses upon the soft belly of the fish only.

In the embodiment as shown in Figs. 4 and 6 the press heads 30 have pressing surfaces shaped as calottes. The press heads are screwed to radially extending arms 40 of the press wheel 23. In the operation of this machine the fish are placed in the conveyor pockets 9 belly forward and, consequently, the adjustment of the press wheel in dependence of increasing sizes of the fish has to be effected in the fish feeding direction, so that the press head 30 is displaced slightly in the direction from the back of the fish when being applied to the fish. For that purpose, a gear wheel 41 secured to the shaft 5 meshes with another gear wheel 43 which is secured to a sprocket 45 and rotatably journalled on a shaft 44 secured to an upright 46 of the frame 4. A rocking arm 47 is turnably journalled on the shaft 44 and provided with a projection 48 to which is secured one end of a tension spring 49 the other end of which is attached to the upright 46 by means of an adjustable nut 50. The hub 24 of the press wheel 23 is rotatably journalled on the shaft 26 secured to the arm 47. A sprocket 53 is secured to the hub 24 and adapted to rotate the press wheel 23. Over the sprocket 53 as well as over the sprocket 45 runs a sprocket chain 54. The eviscerating roller 18 is driven in the same manner as in the embodiment shown in Figs. 1 to 3, but the roller 17 is driven by the roller 18 by means of a gearing 55.

In the embodiment as shown in Fig. 5 the shaft 15 is rotated in a direction opposite to that indicated in Fig. 2 and it drives by means of the sprocket 35 and chain 36 a sprocket 56, which is secured to a gear wheel 57 which is rotatably journalled on a shaft 58 secured to the machine frame. The shaft 26 for rotating the press wheel 23 is rotatably journalled in an upwardly directed slot 60 in an upright 59, so that it can be displaced transversely upwardly in the slot against the press power of a spring 61. The press wheel 23 is rotated by a gear wheel 62 secured to same and meshing with the gear wheel 57. When a press head 30 of the press wheel 23 is moved into pressing engagement with a fish it is elevated, and thus it gauges the thickness of the fish. Consequently, the gear wheel 62 rolls slightly upon the gear wheel 57, so that a slightly increased rotary velocity is imparted to the press wheel 23. Therefore, the press head 30 engaging the fish is moved in the fish feeding direction somewhat faster than the fish, so that it is displaced transversely upon the fish in its feeding direction, i. e. in a direction from the back of the fish towards its belly. Thus the press head 30 will engage the soft belly of the fish only, so that even a slight pressure will cause an effective jamming of the body of the fish and, furthermore, a kneading action will be exerted upon the fish, so that the squeezing of the entrails out of the head end of the fish will be facilitated without any risk of injuring the body of the fish by hard pressure and without jamming up the intestine simultaneously within the body of the fish.

I claim:

1. The method of eviscerating fish comprising moving a press member and the fish in the same direction and also moving the press member against the fish into concentrated pressing engagement with the soft belly of the fish at its opened head end to squeeze part of the entrails out of said head end, and pulling the entrails by said part out of the body of the fish.

2. The method of eviscerating fish comprising feeding the fish laterally towards and past eviscerating means, moving a press member in the feeding direction and into concentrated pressing engagement with the soft belly of the fish at its head end to squeeze part of the entrails out of said head end and present them to said eviscerating means, and causing said eviscerating means to pull the entrails by said part out of the body of the fish.

3. The method of eviscerating fish comprising moving a press member and the fish in the same direction and also moving the press member against the fish into concentrated pressing engagement with the soft belly of the fish at its head end to squeeze part of the entrails out of said head end, pulling the entrails by said part out of the body of the fish, and releasing the pressure upon the head end of the fish before finishing the pulling action.

4. In a fish eviscerating machine, a fish eviscerating means, a conveyor for feeding the fish laterally towards and past said eviscerating means, a press member, means for moving said press member in the fish feeding direction and against the conveyor into pressing engagement with the fish to apply a concentrated pressure upon the head end of the belly of the fish at a position laterally of the back of the fish and squeeze part of the entrails out of the head end of the fish to present them to said eviscerating means, and means for causing said eviscerating means to pull the entrails by said part out of the body of the fish.

5. In a fish eviscerating machine, a fish eviscerating means, a conveyor for feeding the fish laterally towards and past said eviscerating means, a press member, means for moving said press member in the fish feeding direction and against the conveyor into pressing engagement with the fish to apply a concentrated pressure upon the head end of the belly of the fish at a position laterally of the back of the fish and squeeze part of the entrails out of the head end of the fish to present them to said eviscerating means, means for causing said eviscerating means to pull the entrails by said part out of the body of the fish, and means for moving said press member to release the pressure upon the fish before said fish has left said eviscerating means.

6. In a fish eviscerating machine, a fish eviscerating means, a conveyor for feeding the fish laterally towards and past said eviscerating means, a series of press members movable in a circular path, means for successively moving said press members in the fish feeding direction and against said conveyor each into pressing engagement with a fish to apply a concentrated pressure upon the head end of the belly of the fish at a position laterally of the back of the fish and squeeze part of the entrails out of the head end of the fish to present them to said eviscerating means, and means for causing said eviscerating means to pull the entrails by said part out of the body of the fish.

7. In a fish eviscerating machine, a fish eviscerating means, a conveyor for feeding the fish laterally towards and past said eviscerating means, a press wheel rotatable about an axis extending transversely to the feeding direction of said conveyor and having exteriorly a series of radially projecting press heads, means for rotating said press wheel to successively move said press heads in the fish feeding direction and against said conveyor into pressing engagement with consecutive fish to apply a concentrated pressure upon the head end of the belly of the fish at a position laterally of the back of the fish and squeeze part of the entrails out of the head end of the fish to present them to said eviscerating means, and means for causing said eviscerating means to pull the entrails by said part out of the body of the fish.

8. In a fish eviscerating machine, a fish eviscerating means, a conveyor for feeding the fish laterally towards and past said eviscerating means, a press member, means for moving said press member in the fish feeding direction and against the conveyor into pressing engagement with the fish to apply a concentrated pressure upon the head end of the belly of the fish at a position laterally of the back of the fish and squeeze part of the entrails out of the head end of the fish to present them to said eviscerating means, and means for causing said eviscerating means to pull the entrails by said part out of the body of the fish, said pressing member having a convex pressing surface.

9. In a fish eviscerating machine, a fish eviscerating means, a conveyor for feeding the fish laterally towards and past said eviscerating means, a press member, means for moving said press member in the fish feeding direction and against the conveyor into pressing engagement with the fish to apply a concentrated pressure upon the head end of the belly of the fish at a position laterally of the back of the fish and squeeze part of the entrails out of the head end of the fish to present them to said eviscerating means, and means for causing said eviscerating means to pull the entrails by said part out of the body of the fish, said pressing member having a ridgy pressing surface that extends transversely to the fish feeding direction.

10. In a fish eviscerating machine, a fish eviscerating means, a conveyor for feeding the fish laterally towards and past said eviscerating means, a press member, means for moving said press member in the fish feeding direction and against the conveyor into pressing engagement with the fish to apply a concentrated pressure upon the head end of the belly of the fish at a position laterally of the back of the fish and squeeze part of the entrails out of the head end of the fish to present them to said eviscerating means, and means for causing said eviscerating means to pull the entrails by said part out of the body of the fish, said press member being adapted to yield transversely to the fish feeding direction and transversely to the conveyor to adjust its position in dependence of the thickness of the fish.

11. In a fish eviscerating machine, a fish eviscerating means, a conveyor for feeding the fish laterally towards and past said eviscerating means, a press member, means for moving said press member in the fish feeding direction and against said conveyor into pressing engagement with a fish to apply a concentrated pressure upon the head end of the belly of the fish at a position laterally of the back of the fish and squeeze part of the entrails out of the head end of the fish to present them to said eviscerating means, means for causing said eviscerating means to pull the entrails by said part out of the body of the fish, and means for adjusting the movement of the pressing member in the fish feeding direction in dependence of the thickness of the fish.

12. In a fish eviscerating machine, a fish eviscerating means, a conveyor for feeding the fish laterally towards and past said eviscerating means, a press member, means for moving said press member in the fish feeding direction and against said conveyor into pressing engagement with a fish to apply a concentrated pressure upon the head end of the belly of the fish at a position laterally of the back of the fish and squeeze part of the entrails out of the head end of the fish to present them to said eviscerating means, and means for causing said eviscerating means to pull the entrails by said part out of the body of the fish, said press member being movable in a circular path about a shaft extending transversely to the fish feeding direction, said shaft being yieldingly movable transversely to its longitudinal direction in a curved path in and transversely to the fish feeding direction to adjust itself in dependence of the thickness of the fish transversely as well as longitudinally of the fish conveyor.

13. In a fish eviscerating machine, a fish eviscerating means, a conveyor for feeding the fish laterally towards and past said eviscerating means, a press wheel rotatable about an axis extending transversely to the feeding direction of said conveyor and having exteriorly a series of radially projecting press heads, means for rotating said press wheel to successively move said press heads in the fish feeding direction and against said conveyor into pressing engagement with consecutive fish to apply a concentrated pressure upon the head end of the belly of the fish at a position laterally of the back of the fish and squeeze part of the entrails out of the head end of the fish to present them to said eviscerating means, means for causing said eviscerating means to pull the entrails by said part out of the body of the fish, a toothed member, a toothed wheel connected to said press wheel and being adapted to mesh with and roll upon said toothed member and thereby to vary the rotary velocity of said press wheel when said press wheel is adjusted transversely to the fish feeding direction in dependence of the thickness of the fish.

PAUL DANIELSSON.